US009260087B2

United States Patent
Aldrich, III et al.

(10) Patent No.: US 9,260,087 B2
(45) Date of Patent: Feb. 16, 2016

(54) REGENERATIVE BRAKING SYSTEM AND METHOD FOR CONTROLLING A REGENERATIVE BRAKING SYSTEM

(75) Inventors: William L. Aldrich, III, Davisburg, MI (US); Andrew M. Zettel, Ann Arbor, MI (US); Ammar A. Atmeh, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1379 days.

(21) Appl. No.: 12/893,213

(22) Filed: Sep. 29, 2010

(65) Prior Publication Data

US 2012/0078481 A1    Mar. 29, 2012

(51) Int. Cl.
| | |
|---|---|
| B60T 13/74 | (2006.01) |
| G06F 19/00 | (2011.01) |
| B60T 1/10 | (2006.01) |
| B60T 8/1755 | (2006.01) |
| B60T 8/172 | (2006.01) |
| B60W 10/184 | (2012.01) |

(Continued)

(52) U.S. Cl.
CPC ... *B60T 1/10* (2013.01); *B60L 7/10* (2013.01); *B60L 7/24* (2013.01); *B60T 7/042* (2013.01); *B60T 8/172* (2013.01); *B60T 8/1755* (2013.01); *B60T 13/662* (2013.01); *B60W 10/184* (2013.01); *B60T 2220/04* (2013.01); *B60T 2270/604* (2013.01)

(58) Field of Classification Search
CPC ..... B60T 8/1755; B60T 8/172; B60W 10/184
USPC ............... 701/70, 78, 83; 303/10, 112, 113.1, 303/152; 180/165; 60/414
See application file for complete search history.

(56) References Cited

U.S. PATENT DOCUMENTS 5,505,527 A * 4/1996 Gray et al. .................. 303/3
5,511,859 A * 4/1996 Kade et al. .................. 303/3

(Continued)

FOREIGN PATENT DOCUMENTS

| CN | 101049825 A | 10/2007 |
|---|---|---|
| CN | 102858605 A | 1/2013 |
| JP | 2006143099 A | 6/2006 |

OTHER PUBLICATIONS

State Intellectual Property Office of the People'S Republic of China, Office Action for Chinese Patent Application No. 201110297608.1, mailed Dec. 12, 2013.

(Continued)

*Primary Examiner* — James Trammell
*Assistant Examiner* — Majdi Alsomiri
(74) *Attorney, Agent, or Firm* — Ingrassia Fisher & Lorenz, P.C.

(57) ABSTRACT

A brake system for a vehicle having a hydraulic brake system and a regenerative brake system and a method of controlling the same is provided. The brake system may include a brake pedal having a range of motion and configured to control the application of the hydraulic brake system based upon a position of the brake pedal within the range of motion. The brake system may further include a brake controller configured to determine an inflection position of the brake pedal, the inflection position being a position of the brake pedal within the range of motion when the hydraulic brake system begins to apply a brake pressure over a predetermined threshold, wherein the brake controller applies the regenerative brake system based upon inflection position.

18 Claims, 3 Drawing Sheets

(51) Int. Cl.
  *B60L 7/10*   (2006.01)
  *B60L 7/24*   (2006.01)
  *B60T 7/04*   (2006.01)
  *B60T 13/66*  (2006.01)

(56) References Cited

U.S. PATENT DOCUMENTS

| | | | | |
|---|---|---|---|---|
| 5,615,933 | A * | 4/1997 | Kidston et al. | 303/152 |
| 6,158,822 | A * | 12/2000 | Shirai et al. | 303/3 |
| 6,309,031 | B1 * | 10/2001 | Crombez et al. | 303/113.4 |
| 6,663,197 | B2 * | 12/2003 | Joyce | 303/152 |
| 7,232,192 | B2 * | 6/2007 | Teslak et al. | 303/152 |
| 7,630,807 | B2 * | 12/2009 | Yoshimura et al. | 701/48 |
| 2004/0164612 | A1 * | 8/2004 | Worrel | 303/177 |
| 2006/0001314 | A1 * | 1/2006 | Teslak et al. | 303/152 |
| 2009/0118888 | A1 * | 5/2009 | Minarcin et al. | 701/22 |
| 2010/0211282 | A1 * | 8/2010 | Nakata et al. | 701/70 |
| 2010/0275593 | A1 * | 11/2010 | Okada et al. | 60/545 |

OTHER PUBLICATIONS

State Intellectual Property Office of the People'S Republic of China, Office Action for Chinese Patent Application No. 201110297608.1, mailed Sep. 15, 2014.

State Intellectual Property Office of the People'S Republic of China, Office Action in Chinese Patent Application No. 201110297608.1 mailed Mar. 19, 2015.

\* cited by examiner

REGENERATIVE BRAKING SYSTEM AND METHOD FOR CONTROLLING A REGENERATIVE BRAKING SYSTEM

FIELD OF THE INVENTION

The present invention generally relates to braking systems and more particularly relates to controlling regenerative braking systems.

BACKGROUND OF THE INVENTION

Hybrid vehicles and electric vehicles use regenerative braking systems to recapture energy that would otherwise be lost using traditional frictional brakes. However, hybrid and electric vehicles still require frictional brakes since frictional brakes are capable of stopping vehicles more quickly in emergency situations. Accordingly, hybrid and electric vehicles typically incorporate both frictional brakes and a regenerative braking system. In order to maintain traditional pedal configurations, hybrid and electric vehicles typically use a single brake pedal to control when the regenerative and frictional brakes are applied.

Accordingly, it is desirable to have a system and method for controlling when the frictional brakes and regenerative brakes are applied. Furthermore, it is desirable to maintain a linear and consistent feel to the brakes. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A brake system for a vehicle having a hydraulic brake system and a regenerative brake system is provided. The hydraulic brake system applies the friction brakes. Friction brakes convert the vehicle's momentum in to heat; the energy is not recoverable. The regenerative brake system is capable of capturing and storing the vehicle's kinetic energy to also provide vehicle braking. The stored energy can be later used to improve the efficiency of the vehicle. The brake system may include a brake pedal having a range of motion and configured to control the application of the hydraulic brake system based upon a position of the brake pedal within the range of motion. The brake system may further include a brake controller configured to determine an inflection position of the brake pedal, the inflection position being a position of the brake pedal within the range of motion when the hydraulic brake system begins to apply a brake pressure over a predetermined threshold. The brake controller applies the regenerative brake system based on the position of the brake pedal with respect to the determined inflection position.

A method for controlling a brake system for a vehicle having a hydraulic brake system and a regenerative brake system is provided. The method may include determining an inflection position of a brake pedal, the inflection position being a position of the brake pedal when the hydraulic brake system begins to apply a brake pressure to the friction brakes over a predetermined threshold. The method may further include controlling the regenerative brake system based upon the determined inflection position.

BRIEF DESCRIPTION OF THE DRAWINGS

The present invention will hereinafter be described in conjunction with the following figures.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
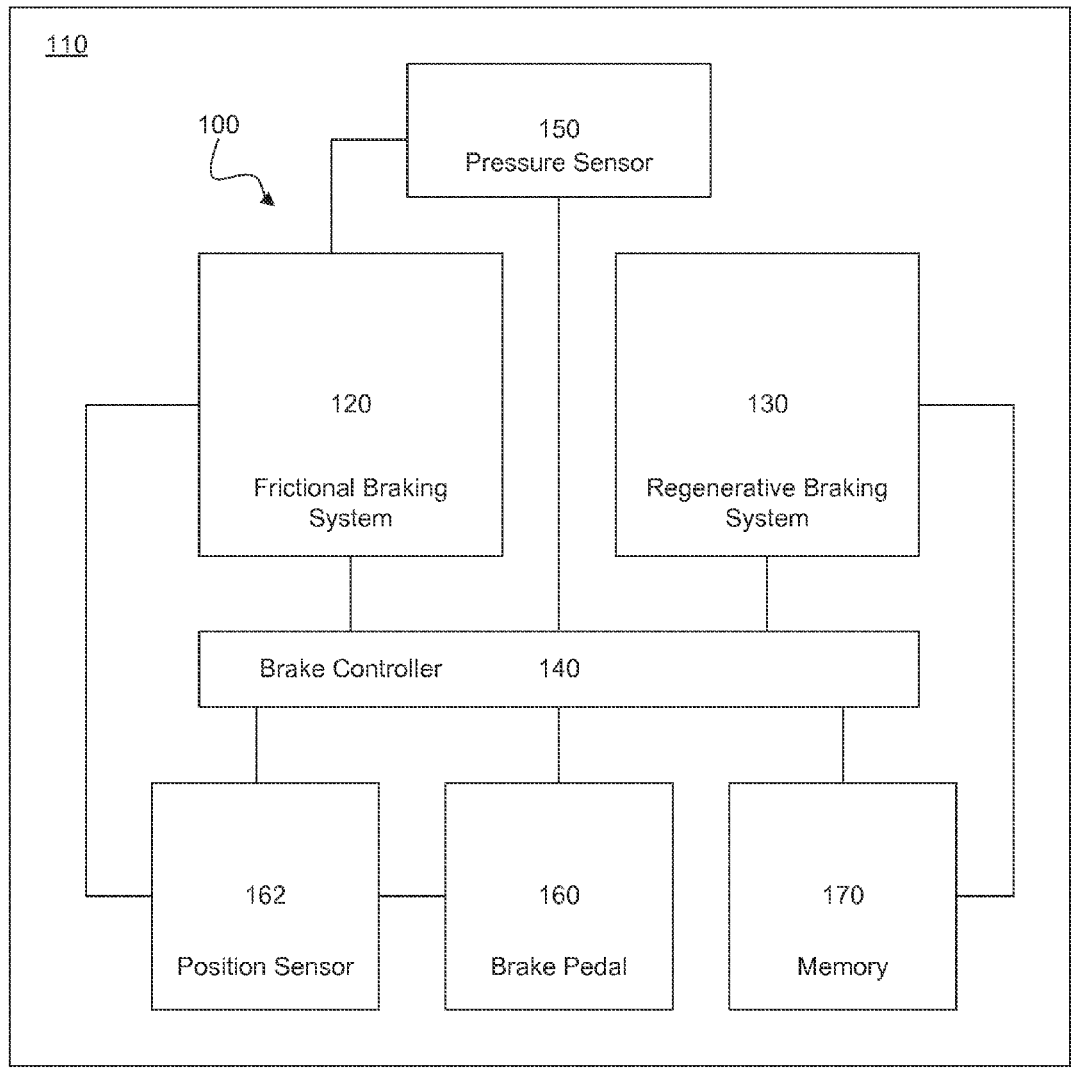
FIG. 1 illustrates an exemplary braking system in accordance with an embodiment.

FIG. 1 illustrates an exemplary braking system 100 for a vehicle 110 in accordance with an embodiment. The braking system 100 includes a frictional braking system 120 configured to stop the vehicle 110 and a regenerative braking system 130 which assists in stopping the vehicle while simultaneously storing energy. The braking system 100 may also include a brake controller 140 and a brake pressure sensor 150. The vehicle 110 may be a hybrid electric/combustion vehicle or a fully electric vehicle. Additionally, vehicle 110 could include any vehicle type which has the ability to capture and store the kinetic energy of the vehicle during deceleration. Energy may be stored, for example, in pneumatic or hydraulic accumulators, flywheel systems (such as a KERS system used in Formula 1 racing), or hydrogen fuel cell vehicles equipped with sufficient battery capacity or super capacitors to store electrical energy.

The frictional braking system 120 may be, for example, a hydraulic braking system. A hydraulic braking system uses brake fluid to transfer pressure from a controlling unit, such as a brake pedal 160 or lever, to the hydraulic fluid actuator to the actual brake mechanism, which is usually at or near the wheel of the vehicle 110. The brake pedal 160 uses mechanical means to pressurize frictional braking system 120. This is typically accomplished via a pushrod actuated by brake pedal 160 which pushes on a piston in the hydraulic fluid actuator. Consequently, the relationship between brake pedal position and fluid pressure is configured by this mechanical arrangement. In other embodiments, the frictional braking system 120 may be an air brake system.

The brake pedal 160 may be mounted in the vehicle 110 in any traditional manner. As discussed above, the brake pedal 160 may be depressed or actuated by a user of the vehicle 110 to control when the frictional braking system 120 is applied and to what degree. The brake pedal 160 may be configured to have a range of motion to control how much friction is applied by the frictional braking system 120, so the rate at which the vehicle 110 decreases in speed can be controlled by the user.

In one embodiment the brake pedal 160 may be attached to a potentiometer or variable resistor used as a brake pedal position sensor 162. As the brake pedal 160 is manipulated by the user, the resistance measured across the brake pedal position sensor 162 varies accordingly. In one embodiment, a raw range of motion available to a user of the brake pedal 160 may be restricted. In other words, the brake pedal 160 may be configured to operate around a pivot point and may not use a full range of the brake pedal position sensor 162. A raw position of the brake pedal 160, relative to the full range of the potentiometer, or a scaled position of the brake pedal 160, relative to the usable range of the potentiometer, may be monitored by the brake controller 140.

The brake controller 140 generally represents the hardware, software, and/or firmware components configured to facilitate communications and/or interaction between the regenerative braking system 130 and the other elements of the braking system 100, as described in greater detail below. Depending on the embodiment, the brake controller 140 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The brake controller 140 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the brake controller 140 includes processing logic that may be configured to carry out the functions, techniques, and processing tasks associated with the operation of the braking system 100, as described in greater detail below. Furthermore, the steps of a method or algorithm described in connection with the embodiments disclosed herein may be embodied directly in hardware, in firmware, in a software module executed by the brake controller 140, or in any practical combination thereof. Although FIG. 1 depicts the brake controller 140 as a distinct and separate element of the braking system, in practice, the brake controller 140 may be integrated with another element of the vehicle 110. Alternately, brake controller 140 may be physically split into two separate physical devices; one controlling the functions for the frictional braking system 120 and the other controlling the functions for the regenerative braking system 130. The split controllers would share signals and data, such as a brake pressure and a brake pedal position between themselves.

The brake controller 140 may control the regenerative braking system based upon the raw or scaled position of the brake pedal 160. The raw position of the brake pedal may correspond to the actual position of the brake pedal relative to the full range of the potentiometer. In contrast, the scaled brake pedal position may correspond to the usable position of the potentiometer. The brake pedal position may be an on-board diagnostic (OBD) compliant signal which can be monitored by the brake controller 140

The braking system 100 further includes brake pressure sensor 150. The brake pressure sensor 150 may be configured to determine a pressure being applied by the frictional braking system 120 and to report that pressure to the brake controller 140. If the frictional braking system 120 is a hydraulic braking system, the brake pressure sensor may be mounted to a hydraulic line of the hydraulic braking system. In one embodiment the brake pressure sensor may not output an OBD compliant signal. In this embodiment, the brake pressure sensor 150 may transmit the brake pressure to the brake controller via another type of signal via a serial communication. In yet another embodiment the brake pressure sensor 150 may output an OBD compliant signal which can be received by the brake controller 140.

In operation, the brake controller 140 receives a brake pressure from the brake pressure sensor 150 when a user depresses the brake pedal 160. The brake controller also receives a raw or scaled brake position of the brake pedal 160. The brake controller then determines an inflection position, the position of the brake pedal 160 when the brake pressure measured by the brake pressure sensor 150 becomes greater than a predetermined threshold. The predetermined threshold may, for example, correspond to a nominal pressure and may vary depending upon the weight, size and/or operation of the vehicle. The inflection position may be determined dynamically, so that if the brake pedal position changes where the brake pressure measured by the brake pressure sensor 150 becomes greater than the predetermined threshold, the inflection position changes accordingly. The inflection position may change for various reasons. For example, as brake pads in the frictional braking system 120 wear down, the brake pedal 160 may have to be depressed further by the user for the brake pressure to exceed the predetermined threshold. Additionally, car to car variation and build tolerances can affect the measured inflection point with respect to the brake pedal position.

The brake controller 140 may store a current inflection position for the vehicle 110 in a memory 170. The brake controller 140 may then control the regenerative braking system 130 based upon the stored inflection position. In one embodiment, the brake controller initiates the regenerative braking system 130 at a brake pedal position a predetermined distance before the inflection position. The predetermined distance may be chosen to maximize the use of the regenerative braking system 130 before the frictional braking system 120 is applied so that an amount of energy stored by the regenerative braking system 130 is maximized while maintaining a consistent feel to the braking system 100.

Because the regenerative brake system 130 is initiated based upon the inflection point and not an initial brake pedal position, the regenerative braking system 130 can be applied more consistently. Vehicle-to-vehicle variations, due to manufacturing or assembly tolerances, in the feel of the braking system can also be minimized. For example, the initial position, also referred to as top-of-travel, of the brake pedal 160 may vary slightly from vehicle to vehicle. Prior vehicles monitored this initial position and scheduled the regenerative braking system with respect to this initial position. However, since the regenerative braking system 130 is applied based upon an inflection position instead of the initial position of the brake pedal, the braking system 100 may feel more consistent to users because it allows a smooth blending of the regenerative and frictional brakes. Further, if a user of the vehicle is using their foot to lift up the brake pedal 160, the user can cause an initial position of the brake pedal to vary by 7% or more. An initial position of brake pedal 160 could also change if the vehicle 110 was being driven on a bumpy road, causing the brake pedal 160 to bounce around. Accordingly, the initial position of the brake pedal may change. However, the brake pedal position at which the friction brakes begin to apply does not change correspondingly. Accordingly, if a regenerative braking system were initiated after a brake pedal travel a certain distance from an initial position, a brake pedal position when the regenerative braking system begins braking the vehicle relative to the brake pedal position that the frictional braking system begins braking the vehicle can vary dramatically. One benefit of the embodiments is that the regenerative braking system 130 and the frictional braking system 120 are applied more consistently.

Furthermore, because the brake pedal position at which the regenerative braking system 130 and frictional braking system 120 each begin to apply pressure are consistent relative to each other, the linearity of the braking system can be improved. In other words, the braking system 100 can be configured such that as the user depresses the pedal 160 the actual braking force applied to the vehicle 110 increases linearly and consistently regardless of the initial position of the brake pedal.

Figure 2:
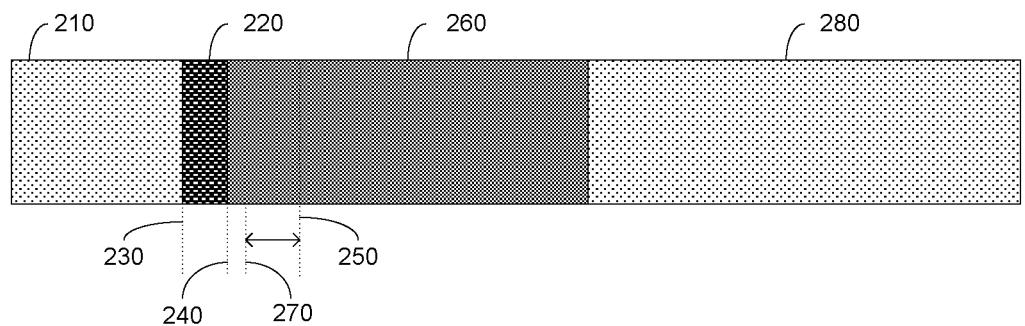
FIG. 2 is a graph illustrating an exemplary operation relative to a raw brake position scale in accordance with one embodiment.

FIG. 2 illustrates a graph illustrating an exemplary operation relative to a raw brake pedal position scale in accordance with an embodiment. Areas 210 and 280 correspond to any unused areas in a brake pedals range of motion, for example, the unused range in a potentiometer. Area 220 corresponds to a range of potential initial brake pedal positions bound by a theoretical minimum initial brake pedal position 230 and a theoretical maximum initial brake pedal position 240. The theoretical maximum initial brake pedal position 240 and the theoretical minimum initial brake pedal position 230 may be defined to take into account manufacturing variations, wear and tear on brake pads and other brake elements, variation due to road conditions (bumpy roads, changes in elevation, etc.), and variations due to user intervention (e.g., a user lifting up on the brake pedal).

As discussed above, the brake controller determines an inflection position 250, a brake pedal position corresponding to when a predetermined amount of pressure is applied to the brake pads by the frictional brake system, within a used range of motion 260 of the brake pedal. The brake controller then determines a brake pedal position 270, a predetermined distance from the inflection position 250. Brake pedal position 270 represents the threshold below which raw brake pedal position sensor data is ignored, i.e. scaled brake pedal position is calculated as zero percent applied. Scaled brake pedal position below (to the left of) point 270 is considered zero percent applied. Scaled brake pedal position above (to the right of) point 270 linearly increases. Consequently, the scaled brake pedal position calculated for inflection point 250 will remain constant even though there can be significant vehicle-to-vehicle variation in the relationship between brake pedal initial position and the inflection point. Typically regen is scheduled between points 270 and 250 with full regen requested by point 250. This allows the braking system to capture as much regenerative braking energy as possible prior to the application of the friction brakes.

Figure 3:
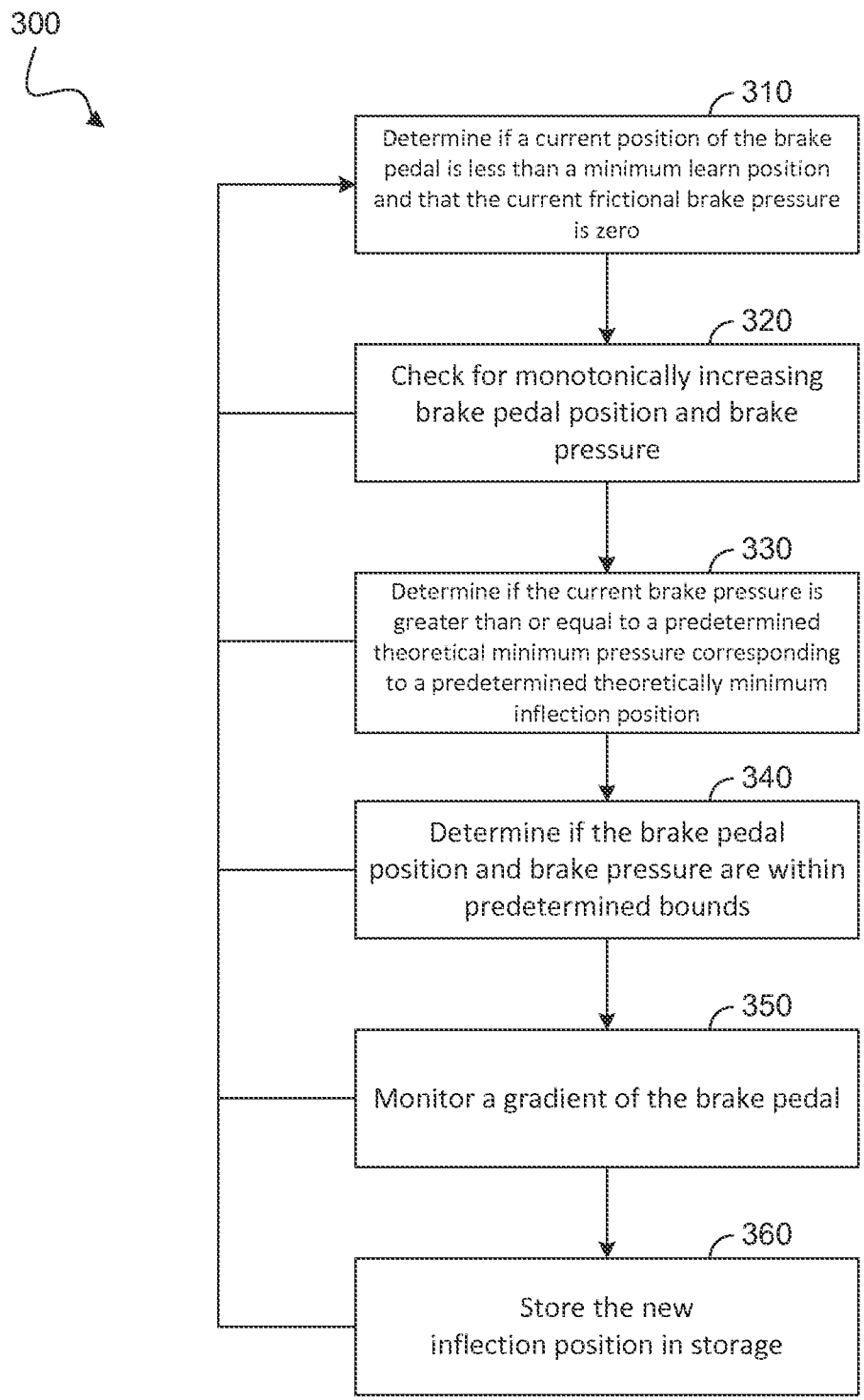
FIG. 3 illustrates an exemplary method in accordance with an embodiment.

FIG. 3 illustrates an exemplary method 300 a brake controller may use in determining an inflection point. The method 300 includes a plurality of learning conditions, prescribing when the brake controller can update the stored inflection position. The brake controller first determines if a current position of the brake pedal is less than a minimum learn position and that the current frictional brake pressure is zero (Step 310). The minimum learn position may, for example, correspond to a theoretically minimum initial (undepressed) position of the brake pedal. Accordingly, in this embodiment the brake controller enters into a learning or updating mode from a state where the brake pressure is zero and the brake pedal is undepressed.

The brake controller then checks for monotonically increasing brake pedal position and brake pressure (Step 320). A monotonically increasing brake pedal position occurs when the brake pedal position is steadily increasing. Likewise, a monotonically increasing brake pressure occurs when the brake pressure is steadily increasing. The brake controller may, for example, sample the brake pedal position and brake pressure at predetermined intervals, for example, every 25 milliseconds. If the user is fluctuating the brake pedal position, which causes the brake pressure to fluctuate, the brake controller may store an inaccurate inflection point depending upon the sample rate of the brake controller. The brake controller may compare the current brake pedal position and pressure against a predetermined number of previously stored positions and pressures to determine if the brake pedal position and pressure are monotonically increasing. If the brake pressure is not monotonically increasing, the brake controller disables the ability to learn a new inflection position and returns to step 310 to await for the appropriate learning conditions.

The brake controller then determines if the current brake pressure is greater than or equal to a predetermined theoretical minimum pressure corresponding to a predetermined theoretically minimum inflection position. (Step 330). The brake controller may then determine if the brake pedal position and brake pressure are within predetermined bounds. (Step 340). For example, the brake controller may then determine if the current brake pressure is less than or equal to a predetermined theoretical maximum pressure corresponding to a predetermined theoretically maximum inflection point. The brake controller may then determine if the current brake pedal position is greater than or equal to a predetermined theoretical minimum position corresponding to a predetermined theoretically minimum inflection point. The brake controller may then determine if the current brake pedal position is less than or equal to a predetermined theoretical maximum position corresponding to a predetermined theoretically maximum inflection point. If the brake controller determines that one of the brake pressure and brake pedal positions is within the theoretical bounds and the other is not within the theoretical bounds, the brake controller will know an error has occurred and would disable the ability to learn a new inflection position. If the brake pressure and brake position are not within the theoretical bounds, the brake controller may disable the ability to learn a new inflection position and return to step 310 to await for the appropriate learning conditions.

The brake controller then monitors a gradient of the brake pedal. (Step 350). As discussed above, the brake controller stores, at predetermined intervals, a position of the brake pedal in a memory. The brake controller may then compare the current brake pedal position to at least one previously stored position to determine a gradient of the brake pedal. If the gradient is below a predetermined slope, the brake controller will know that the brake pedal was not depressed too quickly and will continue with the inflection position learning processes. If the brake pedal is depressed too quickly the brake controller may not capture an accurate inflection position because there may be a delay between a time when a user depresses a brake pedal and when the brake pressure increases. If the brake pedal gradient is greater than a predetermined amount, the brake controller will know that the brake pedal was depressed too quickly, and therefore will disable the ability to learn a new inflection position and return to step 310 to await for the appropriate learning conditions If the brake controller determined that all of the learning conditions in steps 310-350 have been met, the brake controller may then store the new inflection position in storage. (Step 360).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A brake system for a vehicle having a hydraulic brake system and a regenerative brake system, comprising:
   a brake pedal having a range of motion and configured to control application of the hydraulic brake system based upon a position of the brake pedal within the range of motion; and
   a brake controller configured to determine an inflection position of the brake pedal, the inflection position corresponding to a position of the brake pedal within the range of motion when the hydraulic brake system begins to apply a brake pressure over a predetermined threshold,
   wherein the brake controller applies the regenerative brake system based upon the inflection position, and the brake controller is further configured to update the inflection position when a gradient of a current brake position and at least one periodically sampled brake position is less than a predetermined amount.

2. The brake system of claim 1, wherein the brake controller is further configured to apply the regenerative brake system at a brake pedal position a predetermined distance from the inflection position.

3. The brake system of claim 1, further comprising:
   a brake pressure sensor configured to monitor a pressure in a hydraulic line of the hydraulic brake system,
   wherein the brake controller determines the inflection position based upon the pressure monitored by the brake pressure sensor.

4. The brake system of claim 3, wherein the brake controller is further configured to:
   dynamically update the inflection position based upon the position of the brake pedal and the pressure monitored by the brake pressure sensor.

5. The brake system of claim 3, wherein the brake controller is further configured to update the inflection position when:
   the brake position is within a predetermined position range; and
   the pressure monitored by the brake pressure sensor is within a predetermined pressure range.

6. The brake system of claim 1, further comprising:
   a memory,
   wherein the brake controller is configured to store the inflection position in the memory.

7. The brake system of claim 6, wherein the brake controller is further configured to store the periodically sampled brake pedal position in the memory.

8. The brake system of claim 7, wherein the brake controller is further configured to update the stored inflection position based upon the current brake position and the brake pedal positions stored in the memory.

9. The brake system of claim 8, further comprising:
   a brake pressure sensor configured to monitor a pressure in a hydraulic line of the hydraulic brake system,
   wherein the brake controller is further configured to update the stored inflection position based upon the current brake position, at least one of the periodically sampled brake pedal positions stored in the memory and the pressure monitored by the brake pressure sensor.

10. A method for controlling a brake system for a vehicle having a hydraulic brake system and a regenerative brake system, comprising:
    determining, by a processor, an inflection position of a brake pedal, the inflection position corresponding to a position of the brake pedal when the hydraulic brake system begins to apply a brake pressure over a predetermined threshold;
    controlling, by the processor, the regenerative brake system based upon the determined inflection position; and
    updating the inflection position when a gradient of a current brake position and at least one periodically sampled brake pedal positions is less than a predetermined amount.

11. The method of claim 10, further comprising
    applying the regenerative brake system at a brake pedal position a predetermined distance from the inflection position.

12. The method of claim 10, further comprising:
    monitoring a pressure in a hydraulic line of the hydraulic brake system,
    wherein the determining further comprises determining the inflection position based upon the monitored pressure.

13. The method of claim 12, further comprising dynamically updating the inflection position based upon the position of the brake pedal and the monitored pressure.

14. The method of claim 12, further comprising updating the inflection position when:
    the brake position is within a predetermined position range; and
    the monitored pressure is within a predetermined pressure range.

15. The method of claim 10, further comprising:
    storing the inflection position in a memory.

16. The method of claim 15, further comprising: storing the periodically sampled brake pedal position in the memory.

17. The method of claim 16, further comprising updating the stored inflection position based upon the current brake position and at least one of the periodically sampled brake pedal positions stored in the memory.

18. The method of claim 17, further comprising:
    monitoring a pressure in a hydraulic line of the hydraulic brake system,
    updating the stored inflection position based upon the current brake position, at least one of the periodically sampled brake pedal positions stored in the memory and the monitored pressure.

* * * * *